Patented Dec. 10, 1935

2,023,994

UNITED STATES PATENT OFFICE 2,023,994

PROCESS FOR BREAKING PETROLEUM EMULSIONS

Melvin De Groote, St. Louis, and Arthur F. Wirtel, Richmond Heights, Mo., assignors to Tretolite Company, Webster Groves, Mo., a corporation of Missouri No Drawing. Application November 12, 1934, Serial No. 752,722

9 Claims. (Cl. 196—4)

This invention relates to the treatment of emulsions of mineral oil and water, such as petroleum emulsions, for the purpose of separating the oil from the water.

Petroleum emulsions are of the water-in-oil type, and comprise fine droplets of naturally-occurring waters or brines, dispersed in a more or less permanent state throughout the oil which constitutes the continuous phase of the emulsion. They are obtained from producing wells and from the bottoms of oil storage tanks, and are commonly referred to as "cut oil", "roily oil", "emulsified oil" and "bottom settlings".

The object of our invention is to provide a novel, inexpensive and efficient process for separating emulsions of the kind referred to into their component parts of oil and water or brine.

Briefly described, our process consists in subjecting a petroleum emulsion of the water-in-oil type, to the action of a treating agent or demulsifying agent of a particular composition hereinafter described, thereby causing the emulsion to break down and separate into its component parts of oil and water or brine, when the emulsion is permitted to remain in a quiescent state after such treatment, or subjected to an equivalent separatory procedure.

The treating agent or demulsifying agent contemplated for use in our process consists of a mixture composed of certain alkylated naphthalene sulfonic acid bodies, conventionally blown castor oil, or some similar reactive fatty bodies, and composite dehydration products of ricinoleic acid of the kind characterized by:

(a) A normal iodine number;
(b) An acid number approximating ⅔ or less of that of ricinoleic acid;
(c) An acetyl number approximating ⅔ or less of ricinoleic acid;
(d) Substantial absence of ether type anhydrides; and
(e) The property of regenerating ricinoleic acid by saponification and subsequent acidification.

Substituted aromatic sulfonic acids of various kinds have been suggested as treating agents or demulsifying agents for the demulsification of crude oil emulsions. Sulfonic acids derived from substituted monocyclic aromatics, as well as substituted polycyclic aromatics, have also been employed for breaking petroleum emulsions. Among the various polycyclic aromatics employed to furnish the sulfonic acid is anthracene, as well as naphthalene. The class of substituted aromatic sulfonic acids, employed as part of the mixture used as the demulsifying agent of the present process, are derived solely from naphthalene. It has been suggested to substitute various residues into an aromatic nucleus, such as an alkyl radical, an aryl radical, an aralkyl radical, a cyclo-alkyl, a hydroaromatic radical, a ketone radical, an aldehyde radical, etc. The demulsifying agent employed in our process is composed of a mixture of the kind that one component is derived by the introduction of an alkyl radical into a naphthalene nucleus. Furthermore, in regard to the introduction of alkyl radicals, it has been suggested to employ alkyl radicals having two or three carbon atoms, or alkyl radicals having a larger number of carbon atoms, for instance, eight or ten carbon atoms, and it has also been suggested to introduce radicals derived from polyhydric alcohols, as well as monohydric alcohols. The treating agent or demulsifying agent used in our process consists of a mixture in which one component or member of the mixture is a sulfonic acid body derived from alkylated naphthalene in which the alkyl radical or radicals introduced into the aromatic nucleus contain at least three carbon atoms and not more than four carbon atoms. Briefly stated, then, one component of the mixture which we employ as the demulsifying agent of our process is characterized by the fact that the alkyl radical or radicals are derived from either propyl alcohol or butyl alcohol, or from the corresponding olefines, such as propylene or butylene. It is immaterial whether the alcohols are the normal form or the isomeric form, such as the secondary alcohol, and it is immaterial whether only one alkyl radical be introduced, or if more than one be introduced. These materials will be referred to as alkylated aromatic sulfonic acid bodies, because they may be used in the form of acids, or in the form of salts, or even in the form of esters. Generally speaking, it is most desirable to use them in the form of an ammonium salt. The product obtained by neutralization of such sulfonic acids with a basic amine such as triethanolamine will be considered the same as a salt.

Blown oils derived from castor oil by conventional oxidation processes have been employed for breaking crude oil emulsions. They may be employed in the manner described in U. S. Patent No. 1,929,399, to Fuchs, dated October 3, 1933. Conventionally blown castor oil or other similar oils may be used in specific mixtures of the kinds described in application for patent of De Groote and Wirtel, Serial No. 715,773, filed March 15, 1934. Conventionally blown castor oil or similar materials may be employed in peculiar mixtures of the kind described in co-pending application for patent of Charles N. Stehr, Serial No. 752,713, filed November 12, 1934. As herein used, the expression "conventionally blown, reactive fatty bodies" is intended to include such materials as castor oil; rape seed oil, etc., which are commonly oxidized to produce blown oils. Such materials, prior to conventional oxidation, are liquid at ordinary temperature, and their reactivity to oxidation by air is due to the unsaturated state, as indicated by an iodine number of 85 or higher. Such reactive materials, susceptible to oxidation by conventional methods, obviously exclude butter, lard, etc.

We have found that when alkylated naphthalene sulfonic acid bodies of the particular kind previously mentioned are mixed with conventionally blown oils of the kind previously described, and further mixed with certain dehydration products of ricinoleic acid of a kind hereinafter described, that one obtains a valuable demulsifying agent which, in many instances, is much more effective for breaking crude oil emulsions than any single component of said mixture. As hereinafter specified, our improved mixture is made within certain limits.

In the co-pending application for patent of Charles N. Stehr, Serial No. 752,717, filed November 12, 1934, there is disclosed a process for breaking oil field emulsions, in which the treating agent or demulsifying agent employed, consists of a mixture of blown castor oil or similar reactive fatty bodies, mixed with composite dehydration products of ricinoleic acid of the kind used to form one component or member of the mixture constituting the demulsifying agent of our process. It is to be noted, however, that the demulsifying agent employed in our process is distinguished from the demulsifying agent disclosed in the Stehr application just mentioned, in that our improved demulsifying agent comprises certain alkylated naphthalene sulfonic acid bodies.

We have found, on certain emulsions, for instance, emulsions occurring near Discol, Texas, that the specific members or components of the mixture employed as the demulsifying agent in our process are not particularly effective when used alone. Furthermore, that mixtures of any two of the three components are not particularly effective. However, we have found that when all of the three components are used, i. e., certain blown oils, certain dehydration products of ricinoleic acid, and certain alkylated naphthalene sulfonic acid bodies, the product resulting from the admixture of said three components is a valuable and effective demulsifying agent.

The dehydrated ricinoleic acid body constituting one member or component of the mixture employed as the demulsifying agent in our process, is produced by heating or dehydrating ricinoleic acid. The material thus obtained is employed as such, or it may be used after subsequent esterification, with an added alcohol, or after neutralization (not complete saponification) with a base such as caustic soda, strong ammonia, caustic potash, etc., and most satisfactorily of all, with triethanolamine.

The word "saponification" is used in the chemistry of fats to indicate the conversion of fats, i. e., esters, into fatty acids or their salts. The conversion of a fat into the sodium salt, i. e., soap-making, is frequently referred to as "saponification." Likewise, the neutralization of a fatty acid is referred to as "saponification". The saponification number is an analytical index, which indicates the amount of caustic potash required to replace the glycerol ester or acidic hydrogen, or the like, in a gram of fatty material.

When fats are saponified so as to yield the corresponding fatty acids, the process is sometimes referred to as acid saponification, because the reaction is commonly carried out in the presence of an acid, such as sulfuric acid, and also in the presence of a catalyst, such as a Twitchell reagent, or a Petroff reagent. Often it is conducted at an elevated temperature above the boiling point of water, and sometimes under pressure. Processes intended to produce similar results may depend upon hydrolysis with steam in presence of small amounts of alkalies, or on reaction with water in the presence of enzymes. Naturally, a fat might be saponified with alkali so as to produce the sodium salt, and this salt might be dissolved in water and the fatty acid liberated by means of a dilute mineral acid, such as hydrochloric acid.

Having obtained ricinoleic acid by any one of such processes, we proceed to dehydrate the ricinoleic acid in order to obtain one member or component of the mixture employed as the demulsifying agent of our present process. The easiest method is to heat the ricinoleic acid at slightly above 100° C., or thereabouts, until the acid value has dropped to approximately two thirds or less of the acid value of ricinoleic acid (188), and the acetyl value has dropped in similar proportions. The acetyl value of ricinoleic acid is 164. Under these conditions, the iodine number remains substantially normal, as indicated by value of 80 to 85. A lower temperature can be employed in presence of a non-sulfonating dehydrating agent, such as anhydrous sodium sulfate. Any equivalent method of dehydration may be employed.

The fatty material, thus obtained, is differentiated from ricinoleic acid by virtue of a decreased saponification value and decreased acetyl value. This product is obtained by dehydration, i. e., principally by removal of water of esterification, and perhaps to a minor degree, by removal of water formed by combination of two carboxyl radicals, that is, the formation of an anhydride. Such a product cannot be obtained by decomposition of the kind wherein castor oil is distilled until a loss of weight is incurred, such as 10% or more. When such last named products are saponified and acidified, ricinoleic acid is not regenerated, because pyrolytic decomposition has previously taken place. If the product contemplated for use as one component of the mixture employed as the demulsifying agent of our process is saponified and acidified, then ricinoleic acid is regenerated.

It is also true that material somewhat similar at first casual examination to the material employed as one component of our improved mixture, but in reality, different in composition, may be obtained by the sulfation of castor oil. For example, in the manufacture of Turkey red oil from castor oil, if sulfation is followed by an effective hydrolytic washing process, so as to decompose the fatty acid sulfates, there results somewhat similar materials. This is not customary in the manufacture of Turkey red oil, because one is interested in conserving the fatty acid sulfate content, and not in destroying it. However, in the sulfation of castor oil or ricinoleic acid, at least partial saturation of the ethylene linkages takes place by the formation of an addition product. Subsequently, when the hydrolytic washing process takes place, the sulfuric addition product is decomposed and the ethylene linkage is then saturated by means of an added hydrogen atom and an added hydroxyl radical. Thus, the somewhat similar products obtained by sulfation and effective hydrolytic washing are differentiated from ordinary Turkey red oil manufacture, and are characterized by products having a reduced or lower iodine number, i. e., iodine number which is subnormal compared with the normal iodine number of castor oil or ricinoleic acid which happens to be approximately 80 to 88. Therefore, in order to differentiate the product employed as one member or component of the mixture, constituting the demulsifying agent of our present process, from the products obtained by sulfation of castor oil, followed by effective hydrolytic process, we will indicate that the products employed to furnish one ingredient of our improved mixture must have a normal iodine value. Furthermore, sulfation of castor oil may result, after effective hydrolytic washing, in products having some ether type bodies present. Ether type bodies are derivatives of ricinoleic acid or the like, in which two alcoholiform hydroxyls combine with the loss of a molecule of water. When such products are saponified and esterified, the acetyl value does not go back to normal, because the ether type bodies do not regenerate hydroxyl groups by saponification and acidification. This is analogous to the fact that ordinarily ethyl ether plus alkali does not readily produce ethyl alcohol. Therefore, the products employed as one member of our improved mixture are further characterized and differentiated from other somewhat similar products by being free from ether type bodies.

We do not contemplate using a demulsifying agent derived from the three aforementioned classes of materials in any combination. On the contrary, we contemplate using a demulsifying agent, consisting of a mixture of materials of the kind mentioned and characterized by the fact that each component shall supply not less than 10% of the mixture on a solvent-free basis, and not more than 45% of the mixture on a solvent-free basis. In other words, the mixture, free from solvents, shall consist of 10% to 45% of butylated or propylated naphthalene sulfonic acid bodies, 10% to 45% of the ricinoleic acid dehydration products of the kind mentioned, and 10% to 45% of blown oil of the kind described.

After the mixture has been formed, one may add any suitable diluent of the kind ordinarily used for the dilution of treating agents or demulsifying agents employed in the demulsification of crude oil. The diluents ordinarily added to such demulsifying agents include such materials as the various aliphatic alcohols, such as denatured alcohol, methyl alcohol, ethyl alcohol, butyl alcohol, propyl alcohol, hexyl alcohol, etc.; various petroleum distillates, such as gasolene, kerosene, soft oil, etc.; various coal tar distillates, such as phenol, benzol, toluene, xylene, cresylic acid, tar acid oil, anthracene oil, etc.; and various miscellaneous solvents, such as chlorinated hydrocarbons, sulfur dioxide extract of the kind obtained in refining petroleum, spruce turpentine, pine oil, etc. Water, of course, may also serve as a solvent. In producing our improved demulsifying agent we prefer to use a mixture of kerosene, water and an alcohol, such as denatured alcohol, or propyl alcohol, as a solvent.

Although we have indicated that the mixture constituting the demulsifying agent of our process may be diluted with these various solvents, it is perfectly apparent that the mixture may be prepared by having a solvent present with one or more of the components of the mixture prior to admixture of said components. For instance, kerosene may be mixed with a blown oil or with the ricinoleic acid dehydration products before subsequent admixture with other components. Water may be present as a constituent of the alkylated aromatic sulfonic acid salt, which need not be anhydrous. The alcohol, such as isopropyl alcohol, may be mixed with any of the components. In any event, the mixture is made in any convenient manner, so that the primary material, on a solvent free basis, is characterized by the fact that each of the three members or components contributes not less than 10% and not over 45%, by weight, on the solvent-free mixture.

Generally speaking, the amount of solvent present is such as to reduce the viscosity sufficiently to permit convenient use of the mixture for the purpose for which it is intended. As a rule, the solvent should not exceed more than 40%, by weight, of the final mixture in which the solvents are included.

As is well known, the blown oil employed may be neutralized cautiously with a base, such as caustic soda, so as to neutralize any free carboxylic hydrogen, without decomposition of any ester or ester-like bodies. We prefer to neutralize these blown oils, if they are to be neutralized at all, with a weak base, such as triethanolamine. Likewise, the ricinoleic acid dehydration products may neutralized cautiously, and it is preferable to use a material such as triethanolamine, if they are to be neutralized at all. Sometimes neutralization of either or both of the fatty members of the mixture yields a more effective reagent. As previously pointed out, the substituted naphthalene sulfonic acids may be used in the form of salts, esters, or as the acid itself.

The solubility of the reagent employed will vary with the character of the components and also with the individual ratios employed. Some of the reagents thus prepared may be oil-soluble, some may be water-soluble, and some may be both oil and water-soluble. Some of the reagents may show a rather limited solubility in either oil or water.

The superiority of the treating agent or demulsifying agent previously described is based upon its ability to treat certain emulsions more advantageously and at a somewhat lower cost than is possible with other known demulsifiers, or conventional mixtures thereof. It is believed that the particular demulsifying agent or treating agent herein described will find comparatively limited application, so far as the majority of oil field emulsions are concerned; but we have found that such a demulsifying agent has commercial value, as it will economically break or resolve oil field emulsions in a certain number of cases, which cannot be treated as easily and at so low a cost with the demulsifying agents heretofore available.

We prefer to prepare our improved treating agent or demulsifying agent in the following manner: Castor oil is subjected to an acid saponification process in the presence of a small amount of dilute sulfuric acid, and in the presence of a Petroff reagent, so as to produce a product, which, in acid value, and in acetyl value, approximates ricinoleic acid. A product so obtained, or ricinoleic acid obtained from any other suitable source, is then heated at or slightly above the boiling point of water for approximately 30 hours, until both the acetyl value and the acid value have dropped to about two-thirds of the normal value of ricinoleic acid. This product is then employed to furnish one component of our improved mixture. Conventionally blown castor oil of the kind described in the aforementioned Fuchs patent is prepared in the usual manner, or else purchased in the open market, to furnish a second member of our improved mixture. Butylated naphthalene sulfonic acid is purchased in the open market, or else prepared in the manner described in U. S. Patent No. 1,670,505, to Gunther, dated May 22, 1928. The mixture is preferably made in the following manner: Approximately 350 lbs. of blown oil of the kind described are mixed with approximately 500 lbs. of ricinoleic acid dehydration products of the kind described, approximately 50 lbs. of isopropyl alcohol are then added, and then approximately 100 lbs. kerosene. Approximately 300 lbs. of isobutyl naphthalene sulfonic acid ammonium salt is mixed with approximately 200 lbs. water and then added to the mixture. In event that the naphthalene sulfonic acid salt contains some water, an equivalent amount of the salt is used, and the amount of added water is decreased in a proportionate manner. The mixture is stirred until it gives a homogeneous mixture. It is then ready for use as the reagent in the present process.

In practising our process, a treating agent or demulsifying agent of the kind described above may be brought in contact with the emulsion to be treated in any of the numerous ways now employed in the treatment of petroleum emulsions of the water-in-oil type with chemical demulsifying agents, such, for example, as by introducing the treating agent into the well in which the emulsion is produced; introducing the treating agent into a conduit through which the emulsion is flowing; introducing the treating agent into a tank in which the emulsion is stored; or introducing the treating agent into a container that holds a sludge obtained from the bottom of an oil storage tank. In some instances, it may be advisable to introduce the treating agent into a producing well in such a way that it will become mixed with water and oil that are emerging from the surrounding strata, before said water and oil enter the barrel of the well pump or the tubing up through which said water and oil flow to the surface of the ground. After treatment, the emulsion is allowed to stand in a quiescent state, usually in a settling tank, and usually at a temperature varying from atmospheric temperature to about 200° C., so as to permit the water or brine to separate from the oil, it being preferable to keep the temperature low enough to prevent the volatilization of valuable constituents of the oil. If desired, the treated emulsion may be acted upon by one or more of the various kinds of apparatus now used in the operation of breaking petroleum emulsions, such as homogenizers, hay tanks, gun barrels, filters, centrifuges, or electrical dehydrators.

The amount of treating agent that may be required to break the emulsion may vary from approximately 1 part of treating agent to 500 parts of emulsion, up to 1 part of treating agent to 20,000 or even 30,000 parts of emulsion. The proportion depends on the type of emulsion being treated, and also upon the equipment being used, and the temperature employed. In treating exceptionally refractory emulsions of the kinds known as "tank bottoms" and "residual pit oils", the ratio of 1:500 above referred to, may be required. In treating fresh emulsion, i. e., emulsions that will yield readily to the action of chemical demulsifying agents, the ratio of 1:30,000, above referred to, may be sufficient to produce highly satisfactory results. In general, we have found that for an average petroleum emulsion a ratio of 1 part of treating agent to 5,000 parts of emulsion will usually be found to produce commercially satisfactory results.

Having thus described our invention, what we claim as new and desire to secure by Letters Patent is:

1. A process for breaking petroleum emulsions of the water-in-oil type, which consists in subjecting the emulsion to the action of a demulsifying agent consisting of a mixture composed of:

(A) Conventionally blown fatty bodies;
(B) Dehydrated ricinoleic acid bodies, derived by the dehydration of ricinoleic acid, so as to yield fatty materials, said product being characterized by:
  (a) A normal iodine number;
  (b) Acid number approximating 2/3 or less of that of ricinoleic acid;
  (c) An acetyl number approximating 2/3 or less of ricinoleic acid;
  (d) Substantial absence of ether type anhydrides;
  (e) The property of regenerating ricinoleic acid by saponification and subsequent acidification; and
(C) Alkylated naphthalene sulfonic acid bodies characterized by the fact that the alkyl radicals contain at least three carbon atoms and not more than four carbon atoms and said mixture being further characterized by the fact that A, B and C shall individually contribute at least 10%, by weight, of the mixture on a solvent-free basis and not more than 45%, by weight, of the mixture on a solvent-free basis.

2. A process for breaking petroleum emulsions of the water-in-oil type, which consists in subjecting the emulsion to the action of a demulsifying agent consisting of a mixture composed of:

(A) Conventionally blown castor oil;
(B) Dehydrated ricinoleic acid bodies, derived by the dehydration of ricinoleic acid, so as to yield fatty materials, said product being characterized by:
  (a) A normal iodine number;
  (b) Acid number approximating 2/3 or less of that of ricinoleic acid;
  (c) An acetyl number approximating 2/3 or less of ricinoleic acid;
  (d) Substantial absence of ether type anhydrides;
  (e) The property of regenerating ricinoleic acid by saponification and subsequent acidification; and
(C) Alkylated naphthalene sulfonic acid bodies characterized by the fact that the alkyl radicals contain at least three carbon atoms and not more than four carbon atoms and said mixture being furthermore characterized by the fact that A, B and C shall individually contribute at least 10%, by weight, of the mixture on a solvent-free basis and not more than 45%, by weight, of the mixture on a solvent-free basis.

3. A process for breaking petroleum emulsions of the water-in-oil type, which consists in subjecting the emulsion to the action of a demulsifying agent consisting of a mixture composed of:

(A) Conventionally blown castor oil;

(B) Dehydrated ricinoleic acid bodies, derived by the dehydration of ricinoleic acid, so as to yield fatty materials, said product being characterized by:

(a) A normal iodine number;
(b) Acid number approximating ⅔ or less of that of ricinoleic acid;
(c) An acetyl number approximating ⅔ or less of ricinoleic acid;
(d) Substantial absence of ether type anhydrides;
(e) The property of regenerating ricinoleic acid by saponification and subsequent acidification; and (C) Butylated naphthalene sulfonic acid bodies and said mixture being furthermore characterized by the fact that A, B and C shall individually contribute at least 10%, by weight, of the mixture on a solvent-free basis and not more than 45%, by weight, of the mixture on a solvent-free basis.

4. A process for breaking petroleum emulsions of the water-in-oil type, which consists in subjecting the emulsion to the action of a demulsifying agent consisting of a mixture composed of:

(A) Conventionally blown castor oil;

(B) Dehydrated ricinoleic acid bodies, derived by the dehydration of ricinoleic acid, so as to yield fatty materials, said product being characterized by:

(a) A normal iodine number;
(b) Acid number approximating ⅔ or less of that of ricinoleic acid;
(c) An acetyl number approximating ⅔ or less of ricinoleic acid;
(d) Substantial absence of ether type anhydrides;
(e) The property of regenerating ricinoleic acid by saponification and subsequent acidification; and (C) Butylated naphthalene sulfonic acid salt, and said mixture being furthermore characterized by the fact that A, B and C shall individually contribute at least 10%, by weight, of the mixture on a solvent-free basis and not more than 45%, by weight, of the mixture on a solvent-free basis.

5. A process for breaking petroleum emulsions of the water-in-oil type, which consists in subjecting the emulsion to the action of a demulsifying agent consisting of a mixture composed of:

(A) Conventionally blown castor oil;

(B) Dehydrated ricinoleic acid bodies, derived by the dehydration of ricinoleic acid, so as to yield fatty materials, said product being characterized by:

(a) A normal iodine number;
(b) Acid number approximating ⅔ or less of that of ricinoleic acid;
(c) An acetyl number approximating ⅔ or less of ricinoleic acid;
(d) Substantial absence of ether type anhydrides;
(e) The property of regenerating ricinoleic acid by saponification and subsequent acidification; and (C) Butylated naphthalene sulfonic acid ammonium salt and said mixture being furthermore characterized by the fact that A, B and C shall individually contribute at least 10%, by weight, of the mixture on a solvent-free basis and not more than 45%, by weight, of the mixture on a solvent-free basis.

6. A process for breaking petroleum emulsions of the water-in-oil type, which consists in subjecting the emulsion to the action of a demulsifying agent comprising a mixture composed of:

(A) Conventionally blown castor oil;

(B) Dehydrated ricinoleic acid bodies, derived by the dehydration of ricinoleic acid, so as to yield fatty materials, said product being characterized by:

(a) A normal iodine number;
(b) Acid number approximating ⅔ or less of that of ricinoleic acid;
(c) An acetyl number approximating ⅔ or less of ricinoleic acid;
(d) Substantial absence of ether type anhydrides;
(e) The property of regenerating ricinoleic acid by saponification and subsequent acidification; and (C) Butylated naphthalene sulfonic acid ammonium salt, and said mixture being furthermore characterized by the fact that A, B and C shall individually contribute at least 10%, by weight, of the mixture on a solvent-free basis and not more than 45%, by weight, of the mixture on a solvent-free basis, said demulsifying agent also comprising a solvent added to said mixture.

7. A process for breaking petroleum emulsions of the water-in-oil type, which consists in subjecting the emulsion to the action of a demulsifying agent consisting of a mixture composed of:

(A) Conventionally blown castor oil;

(B) Dehydrated ricinoleic acid bodies, derived by the dehydration of ricinoleic acid, so as to yield fatty materials, said product being characterized by:

(a) A normal iodine number;
(b) Acid number approximating ⅔ or less of that of ricinoleic acid;
(c) An acetyl number approximating ⅔ or less of ricinoleic acid;
(d) Substantial absence of ether type anhydrides;
(e) The property of regenerating ricinoleic acid by saponification and subsequent acidification; and (C) Butylated naphthalene sulfonic acid ammonium salt and said mixture being furthermore characterized by the fact that A, B and C shall individually contribute at least 10%, by weight, of the mixture on a solvent-free basis and not more than 45%, by weight, of the mixture on a solvent-free basis, said demulsifying agent also comprising a solvent added to said mixture and composed of a mixture of water, kerosene and an alcohol.

8. A process for breaking petroleum emulsions of the water-in-oil type, which consists in subjecting the emulsion to the action of a demulsifying agent consisting of a mixture composed of:

(A) Conventionally blown castor oil;
(B) Dehydrated ricinoleic acid bodies, derived by the dehydration of ricinoleic acid, so as to yield fatty materials, said product being characterized by:
 (a) A normal iodine number;
 (b) Acid number approximating 2/3 or less of that of ricinoleic acid;
 (c) An acetyl number approximating 2/3 or less of ricinoleic acid;
 (d) Substantial absence of ether type anhydrides;
 (e) The property of regenerating ricinoleic acid by saponification and subsequent acidification; and
(C) Butylated naphthalene sulfonic acid ammonium salt and said mixture being furthermore characterized by the fact that A, B and C shall individually contribute at least 10%, by weight, of the mixture on a solvent-free basis and not more than 45%, by weight, of the mixture on a solvent-free basis, said demulsifying agent also comprising a solvent added to said mixture and composed of water, kerosene, and isopropyl alcohol.

9. A process for breaking petroleum emulsions of the water-in-oil type, which consists in subjecting the emulsion to the action of a demulsifying agent consisting of a mixture composed of:

(A) Approximately 350 lbs. conventionally blown castor oil;
(B) Approximately 500 lbs. dehydrated ricinoleic acid bodies, derived by the dehydration of ricinoleic acid, so as to yield fatty materials, said product being characterized by:
 (a) A normal iodine number;
 (b) Acid number approximating 2/3 or less of that of ricinoleic acid;
 (c) An acetyl number approximating 2/3 or less of ricinoleic acid;
 (d) Substantial absence of ether type anhydrides;
 (e) The property of regenerating ricinoleic acid by saponification and subsequent acidification; and
(C) Approximately 300 lbs. butylated naphthalene sulfonic acid ammonium salt, together with an added solvent consisting of approximately 200 lbs. of water, approximately 100 lbs. kerosene and approximately 50 lbs. isopropyl alcohol.

MELVIN DE GROOTE.
ARTHUR F. WIRTEL.